(12) United States Patent
Bloebaum et al.

(10) Patent No.: US 7,800,535 B2
(45) Date of Patent: Sep. 21, 2010

(54) MULTI-FUNCTION DEVICE WITH POSITIONING SYSTEM AND SHARED PROCESSOR

(75) Inventors: Scott Bloebaum, Cary, NC (US); Andrew Chou, San Mateo, CA (US); Benjamin Van Roy, San Mateo, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 12/186,398

(22) Filed: Aug. 5, 2008

(65) Prior Publication Data

US 2009/0102710 A1 Apr. 23, 2009

Related U.S. Application Data

(60) Continuation of application No. 11/692,699, filed on Mar. 28, 2007, now Pat. No. 7,408,505, which is a continuation of application No. 11/053,113, filed on Feb. 7, 2005, now Pat. No. 7,212,156, which is a division of application No. 10/286,360, filed on Nov. 1, 2002, now Pat. No. 7,132,980.

(51) Int. Cl.
*G01S 19/37* (2010.01)
(52) U.S. Cl. ............................................. 342/357.77
(58) Field of Classification Search ...................... None
See application file for complete search history.

(56) References Cited

U.S. PATENT DOCUMENTS 5,497,339 A * 3/1996 Bernard ...................... 708/109
5,877,724 A * 3/1999 Davis ........................ 342/357.1
5,943,363 A * 8/1999 Hanson et al. ............... 375/150
6,097,974 A * 8/2000 Camp et al. ............... 455/575.7
6,297,771 B1 * 10/2001 Gronemeyer ................ 342/378
6,369,753 B1   4/2002 Schucker et al.
6,430,503 B1 * 8/2002 McBurney et al. .......... 701/213
6,516,285 B1 * 2/2003 Hori et al. .................... 702/150
6,526,322 B1 * 2/2003 Peng et al. ....................... 700/5
6,754,509 B1 * 6/2004 Khan et al. ................ 455/556.1
6,775,319 B2   8/2004 King et al.
7,132,980 B2 * 11/2006 Bloebaum et al. ............ 342/378
2001/0014597 A1 * 8/2001 Takiguchi et al. ............ 455/343
2003/0085837 A1 * 5/2003 Abraham .................. 342/357.1
2003/0139879 A1 * 7/2003 Krasner ........................ 701/213
2003/0151547 A1 * 8/2003 Mauro et al. ........... 342/357.15

OTHER PUBLICATIONS

Dr. A. R. Pratt, Combining GPS And Cell Phone Handsets—The Intelligent Approach, ION GPS 1999, Sep. 14-17, 1999, Nashville, TN.

* cited by examiner

*Primary Examiner*—Gregory C Issing
(74) *Attorney, Agent, or Firm*—Haynes and Boone, LLP

(57) ABSTRACT

A multi-function device with a positioning function and a real time positioning engine is disclosed. The device contains also a shared processor used by the positioning function and other functions of the device, such as a mobile radio-communication function. The positioning engine performs in real time the most computational intensive calculations of the positioning function, such as downsampling, Doppler mixing and correlation calculations. Since the received signal need not be stored, the memory requirements of the positioning function are significantly reduced if aiding data is available.

20 Claims, 8 Drawing Sheets

Multi-function device

Positioning method

Positioning Engine (PE)

Real time method performed by PE

PE timing diagram

Background positioning method

Downsampler

Narrowband noise detection method

MULTI-FUNCTION DEVICE WITH POSITIONING SYSTEM AND SHARED PROCESSOR

CROSS REFERENCE TO RELATED APPLICATIONS

The present application is a Continuation of U.S. patent application Ser. No. 11/692,699, filed Mar. 28, 2007 now U.S. Pat. No. 7,408,505, which is a Continuation of U.S. patent application Ser. No. 11/053,113, filed Feb. 7, 2005; U.S. Pat. No. 7,212,156, which is a Division of U.S. patent application Ser. No. 10/286,360, filed Nov. 1, 2002, U.S. Pat. No. 7,132,980, the contents of which are incorporated by reference in their entirety.

BACKGROUND OF THE INVENTION

1. Field of the Invention

This invention relates to a mobile multi-function device with the capability of receiving and processing positioning signals, and more particularly, to methods and systems to minimize cost, size and power consumption by sharing resources between the positioning function and the other functions of the device. In a preferred embodiment, one of the other functions is a mobile radio communication terminal.

2. Background Art

Mobile multi-function devices with the capability of determining their geographical location have recently gained popularity. These devices calculate their location by receiving and processing positioning signals, such as GPS signals. In addition, they may incorporate the functionality of other devices such as a mobile radio communication terminal, (e.g. cellular phone), a personal digital assistant (PDA), a multimedia player with music and video reproduction capabilities, etc.

One approach to improve the performance of these devices and to reduce their size, cost and power consumption is to share resources between the positioning function and the other functions of the device. For instance, the GPS-receiver and cellular phone combo device disclosed in U.S. Pat. No. 6,002,363 by Krasner contains a processor that performs all the calculations needed to process GPS signals and all the calculations associated with the cellular phone function.

In difficult environments where some components of the positioning signal are highly attenuated it is necessary to receive and process a long segment of positioning signal in order to attain the required sensitivity. The device disclosed by Krasner stores the received signal (after sampling) in a memory and then carries out all the digital processing of the stored signal in the shared processor. Hence, a drawback of Krasner's device is that a large memory is required to store enough received signal to calculate the location in difficult environment. Another drawback is that the shared processor is occupied with the processing of the positioning signal for a long time during which it is not available for other functions.

What is needed is a method and a system to transform the received positioning signal into a signal with reduced memory requirement so as to reduce the cost, size and power consumption associated with the memory of the device. Also, a method and a system are needed to offload most of the calculations relating to the positioning function from the shared processor so as to increase the availability of the shared processor to the other functions of the device.

SUMMARY OF THE INVENTION

One embodiment of the present invention is shown in FIG. 1. The Positioning Engine 140 performs, in real time, a significant portion of the calculations for processing the positioning signal, including frequency conversion from IF to baseband and certain primitive correlation calculations. Since the Positioning Engine 140 operates in real time, no memory is needed to store the received signal. Furthermore, the other functions of the device are less disrupted by the positioning function because the most computationally intensive part of the signal processing calculations are performed by the Positioning Engine 140 rather than the shared processor CPU 151.

Some embodiments of the present invention rely on techniques disclosed in the following U.S. patent applications:

- Signal Acquisition using Data Bit Information (Ser. No. 09/888,228 filed Jun. 22, 2001, hereafter referred to as application 228), which is expressly incorporated herein by reference;
- Synthesizing Coherent Correlation Sums at One or Multiple Carrier Frequencies Using Correlation Sums Calculated at a Coarse Set of Frequencies (Ser. No. 09/888,227 filed Jun. 22, 2001, hereafter referred to as application 227), which is expressly incorporated herein by reference;
- Extracting Fine-Tuned Estimates from Correlation Functions Evaluated at Limited Number of Values (Ser. No. 09/888,338 filed Jun. 22, 2001, hereafter referred to as application 338), which is expressly incorporated herein by reference;
- Determining the Spatio-Temporal and Kinematic Parameters of a Signal Receiver and its Clock by Information Fusion (Ser. No. 09/888,229 filed Jun. 22, 2001, hereafter referred to as application 229), which is expressly incorporated herein by reference;
- Determining Location Information Using Sampled Data Containing Location-Determining Signals And Noise (Ser. No. 09/888,337 filed Jun. 22, 2001, hereafter referred to as application 337), which is expressly incorporated herein by reference;
- System and method to estimate the location of a receiver in a multi-path environment (Ser. No. 10/237,556, filed on Sep. 6, 2002, hereafter referred to as application 556), which is expressly incorporated herein by reference;
- System and method estimate the location of a receiver (Ser. No. 10/237,557 filed on Sep. 6, 2002, hereafter referred to as application 557), which is expressly incorporated herein by reference.

DETAILED DESCRIPTION OF THE INVENTION

Figure 1:
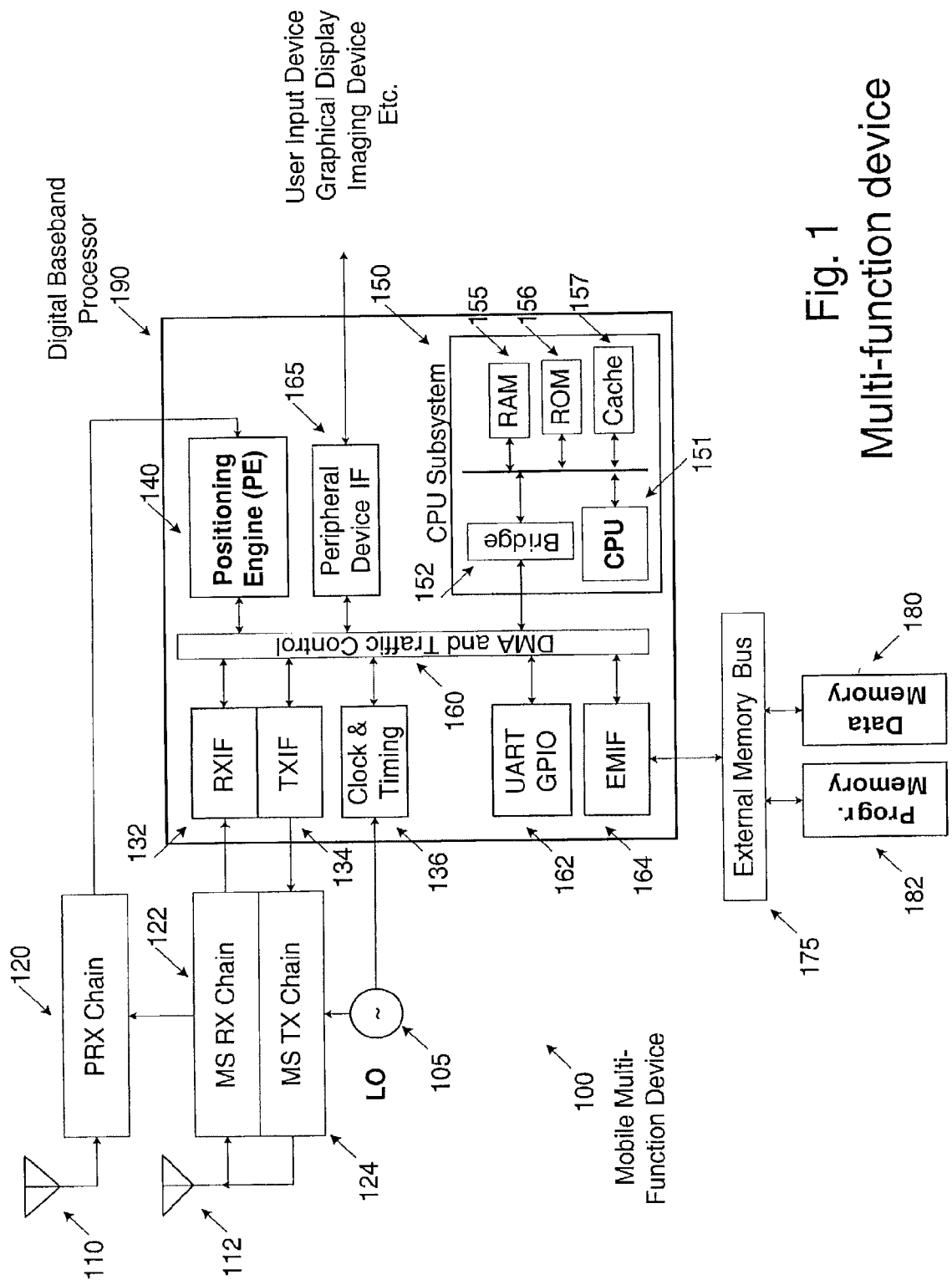
FIG. 1 is a block diagram of a multi-function device performing a positioning function and a mobile radio-communication function.

In a preferred embodiment of this invention, the multi-function device comprises a Positioning Receiver Function (called PRX) and a Mobile Radio Communication Terminal (called MS, shorthand for "Mobile Station"). For information on mobile radio communication terminals refer to *The Mobile Communication Handbook*, edited by Gibson and published by CRC Press. A block diagram of a preferred embodiment of the Mobile Multi-Function Device 100 is shown in FIG. 1. The positioning signals are received via the Antenna 110 and input to the positioning radio receiver, PRX Chain 120. Typically, in the PRX Chain 120, the positioning signals are amplified, filtered, and translated from their carrier frequency to an intermediate frequency (IF). Then, the positioning signals are sampled, quantized and input to the Positioning Engine (PE) 140.

The MS function of the device provides voice and/or data communication with a mobile radio network. The most common example of the MS function is a cellular phone that communicates with cellular base stations (BS) that are part of a commercially operated network. The MS function receives and transmits radio communication signals via the Antenna 112, the MS RX Chain 122, and the MS TX Chain 124. Typically, MS Chains 122 and 124 are composed of individual blocks such as filters, amplifiers mixers, phase-locked loops, A/D and D/A converters, as described in Gibson's book.

Although FIG. 1 indicates that the PRX function and the MS function have their own dedicated antennas and RF chains, those skilled in the arts will recognize that parts of these circuitry can be shared, as described for example in Krasner's U.S. Pat. No. 6,002,363 and in U.S. Pat. No. 6,097,974 by Camp et al. Local Oscillator (LO) 105 is the frequency source for the MS RX and TX Chains, and optionally for the PRX Chain.

Another functional subsystem (not shown in FIG. 1) is an analog baseband block, which is connected to the Clock & Timing block 136, the LO 105, and the MS Chains 122 and 124. The analog baseband block contains interfaces to the MS Chains 122 and 124 for controlling the transmitter, changing radio channels, and adjusting the frequency of the LO 105, which, in the preferred embodiment, is the frequency source for the entire device. Optionally, the analog baseband block may contain an interface to a speaker and microphone for voice communication, as well as code for quantizing and reconstructing the voice signals.

Block 190 is the Digital Baseband Processor. The CPU Subsystem 150 represents the CPU functionality that typically would be found on a single digital application-specific integrated circuit (ASIC). This includes CPU 151 (the shared processor), internal program memory 156, data memory 155, instruction and/or data cache 157, the Bridge 152, and hardware interface blocks used to control other peripheral devices. CPU Subsystem 150 executes software for most functions in the device, including MS-BS communication protocol, peripheral hardware control, user interface, and tasks required by other functions, including the Positioning Receiver Function (PRX). Since the amount of internal memory may not be sufficient for all processing, CPU 151 may also (optionally) access the external Program Memory 182 and the external Data Memory 180 via the External Memory Interface (EMIF) 164. The CPU 151 also interfaces to the MS RX Chain 122 via the Receiver Interface (RXIF) 132 and to the MS TX Chain 124 via the Transmitter Interface (TXIF) 134. The CPU 151 also may have interfaces to external devices via serial communication ports (UARTs) and General-Purpose Input/Output lines (GPIO) 162. For instance, these interfaces may be used to control or monitor the various Chains (120; 122 and/or 124), e.g., for turning them on and off, for adjusting the TCXO frequency with an AFC output, for changing the frequency of the MS RX and/or TX synthesizers in order to tune the MS to a new channel, and for communicating with a display or keypad controller. In some embodiments, a synchronized serial interface (SSI) may be used to enable communication with devices requiring a clocked serial interface. The Digital Baseband Processor 190 also contains interfaces to control user-interface devices such as a graphical display and a keypad. Finally, digital baseband processor 190 optionally contains a Digital Signal Processor (DSP) subsystem that may be used to execute compute-intensive tasks such as encoding and decoding the quantized voice samples and the physical layer for the communication with the BS. Optionally the DSP may have access to the present external memory.

PRX Chain 120 interfaces to the digital section via the PE 140. The PE 140 is a hardware block that performs the computationally intensive operations of the PRX such as filtering, downsampling, correlating, etc., and then writes the resulting data (called "PB results") to a memory device. In the case of a Global Positioning System (GPS) PRX, the main task of PE 140 is to compute the correlations between short segments (called "primitive segments") of the received signal and locally generated copies of the pseudo-random noise (PRN) codes (the "reference" codes) for the satellites hypothesized to be visible by the device. In some embodiments, the PE 140 resides outside of the Digital Baseband Processor 190 and is connected to the External Memory Bus 175. In other embodiments, the PE 140 resides within the Digital Baseband Processor 190, as shown in FIG. 1.

One particular feature of this architecture is that the PE 140 operates relatively independently of the CPU Subsystem 150, performing the compute-intensive calculations in real-time and allowing the CPU 151 to be occupied with tasks related to the other functions of the device. The PE 140 also writes its results to a memory (for instance the external Data Memory 180) without intervention from the CPU Subsystem 150, such as by using the Direct Memory Access (DMA) 160 to gain control of the External Memory Bus 175. Once the PE 140 has completed the intense real-time calculations and written the results to a memory, the CPU 151 can further process the stored PE results as a non-real-time background task. This process-buffer-process approach enables the CPU 151 to execute other, more time-critical tasks along with the PRX-related tasks. This process also has the following advantages:

Reduced CPU computation. Since the PE 140 performs the computationally intensive tasks before storing the results to memory, this burden is removed from the CPU 151. One result is that the CPU 151 has more resources to devote to the other function and still meet any latency requirements for computing a position result.

Reduced CPU memory. When the PRX has received aiding data, such as for example approximate location and time, trajectories of the signal source, etc., the size of the computational output of the PE 140 is much smaller than the size of the signal samples that were used to generate the output. This reduces the PRX memory requirements relative, for instance, to the implementation described in Krasner's U.S. Pat. No. 6,002,363, in which the sampled received signal is stored in memory in its entirety.

As mentioned before, the CPU Subsystem 150 executes the software overseeing all the functions of the device. In some embodiments, the allocation of the computational and memory resources is handled by an operating system (OS). All of the tasks associated with the various device functions are allocated resources by the OS, with the allocated amount determined by both need and availability. As new functions or tasks are started, the OS allocates data memory to them from the available physical memory, and as executing tasks are completed or terminated, the OS frees the memory allocated for those tasks. In a multi-function device, the various functions will operate independently from each other. In addition, certain functions may require allocations from a particular part of the memory with particular characteristics (e.g. fast internal memory for computationally intensive functions). So, the net effect of task independence and constraints is that the available data memory in a multi-function device may be very fragmented, and large contiguous blocks may not be to be available. Thus, in these embodiments, the PE 140 can't rely on a contiguous block of memory for writing its results. An approach to overcome this problem is described later. Note that this problem does not occur in those embodiments where the PE 140 stores its computational results in a dedicated memory.

Method to Calculate a Location

Figure 2:
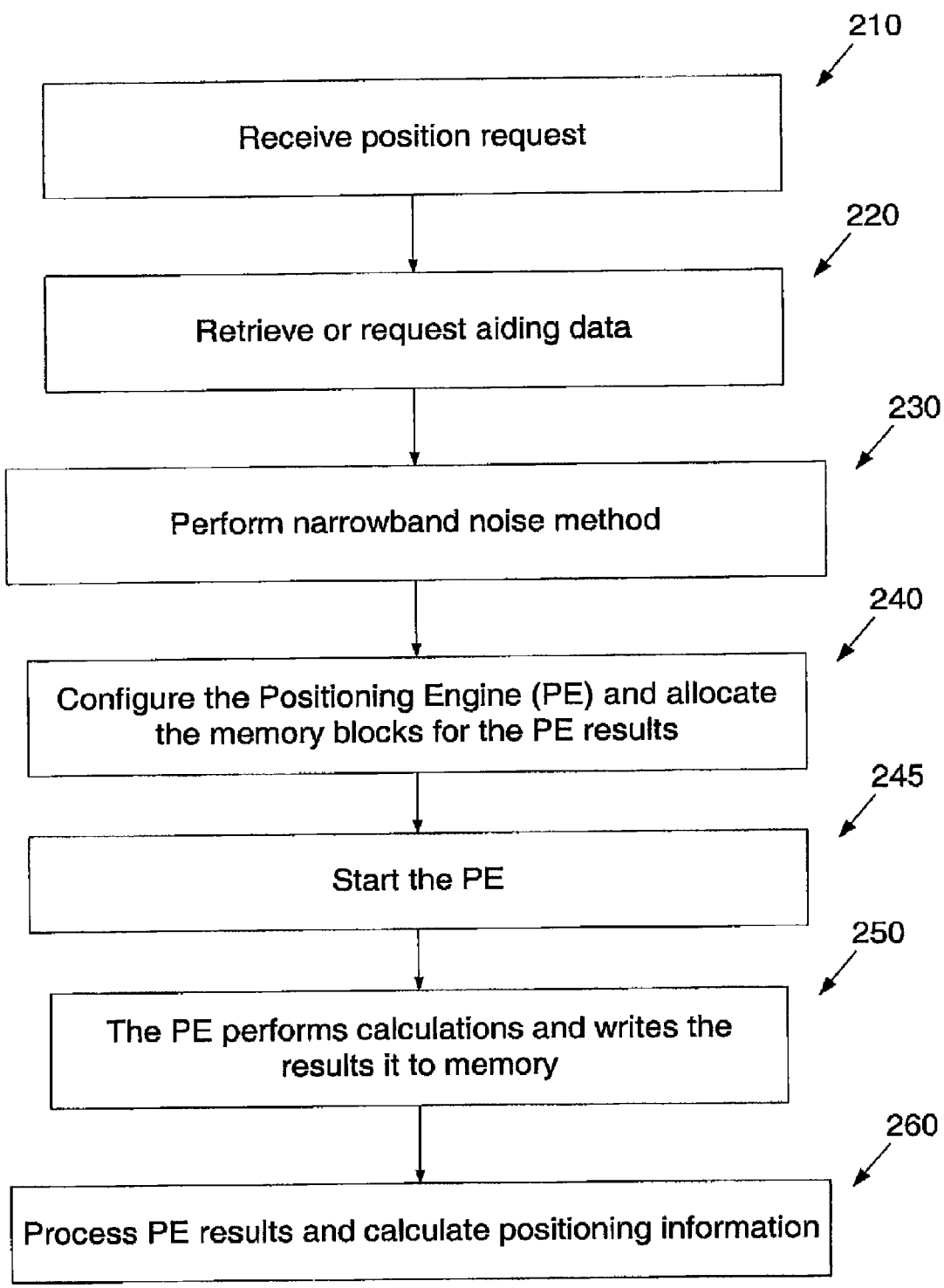
FIG. 2 is a flow diagram of a method for calculating positioning information that utilizes a positioning engine.

FIG. 2 illustrates a method used in relation to the Mobile Multi-Function Device 100 of FIG. 1 to implement the Positioning Function (PRX). At 210, the PRX Control function (PRXC) software running on the CPU 151 receives a request for the user's position or position-related measurements, either from an internal source (e.g., user menu selection) or from an external source (e.g. protocol message via communication to BS). Optionally, at 220, the PRXC retrieves stored aiding data (e.g. GPS ephemeris, approximate location and time) or requests and receives new aiding data from an external source (e.g. server attached to radio network). At 230, an optional narrow-band mitigation method is applied. This is described in more detail in a subsequent section.

At 240, the PRXC turns on the PRX Chain 120 and configures the PE 140 with the duration of input signal to process, the length value L of the primitive segments used to calculate primitive correlation values, a set of Source-Doppler Pairs (SDP) to be searched for a signal acquisition, a range of code-phases to be searched for each SDP, and possibly other parameters. In some embodiments, the various signal sources may use primitive segments with different lengths L. An SDP is characterized by the identity of a positioning signal sources (e.g. GPS satellite) hypothesized to be visible, and a Doppler frequency hypothesized for the source. In some preferred embodiments, multiple Doppler frequencies with spacing roughly inversely proportional to the primitive segment length L, are hypothesized for each visible source in order to cover the whole Doppler uncertainty (the reader is referred to Applications 227 and 557 for more details). In addition, in some embodiments, the PRXC requests from the OS a block of data memory for each SDP, with size according to the signal duration. The OS responds then with pointers to these blocks, which the PRXC stores and uses to configure the PE's DMA registers 381 in FIG. 3A. In other embodiments, the PE 140 writes its results to internal memory, for example RAM 155.

At 245, the PE 140 utilizes CPU hardware resources (e.g. clock and timing generator) to generate an event that starts operation of the PE 140. At 250, the PE 140 begins operation on this event and ceases after operating for the configured duration. During operation, it writes the PE results for each programmed SDP into the assigned area in the common data memory or to internal memory, e.g. RAM 155. The PRXC turns off the PRX RF Chain 120 after the PE operation ceases. At 260, when the Operating System (OS) running in the CPU 151 determines that there are sufficient computational resources available, it initiates the PRX Processing Function (PRXP) as a background task that runs along with other tasks such as the air-interface protocol stack. The PRXP runs as a background task, reading the PE results from the known memory locations, until it finishes processing the PE results and generates the requested positioning information. In some embodiments this positioning information comprises an estimated location and, optionally, some additional information about the uncertainty in this estimate. In other embodiments, the positioning information comprises certain intermediate quantities, such as pseudoranges, code-phases or other features of the correlation functions, which provide the basis for calculating a location. This auxiliary positioning information may be transmitted to a server via a radio communication function (e.g. through a cellular phone network), so that the server can calculate the location information.

The Positioning Engine

A preferred embodiment where the PRX function utilizes GPS signals is now described. Those skilled in the arts will recognize that other embodiments of this invention based on other types of positioning signals can be similarly devised.

The PE 140 operates sequentially and in real-time on consecutive segments of the received signal (called "primitive segments") and writes its computation results (the "PE results") to a memory device. Typically, the duration L of the primitive segments is a multiple or fractional multiple of 1 ms. In some preferred embodiments, L is between 0.25 ms and 8 ms, but other values are possible. The positioning data generated by the PE 140 comprises a plurality of primitive correlation values associated with the primitive segments of received signal.

Figure 3A:
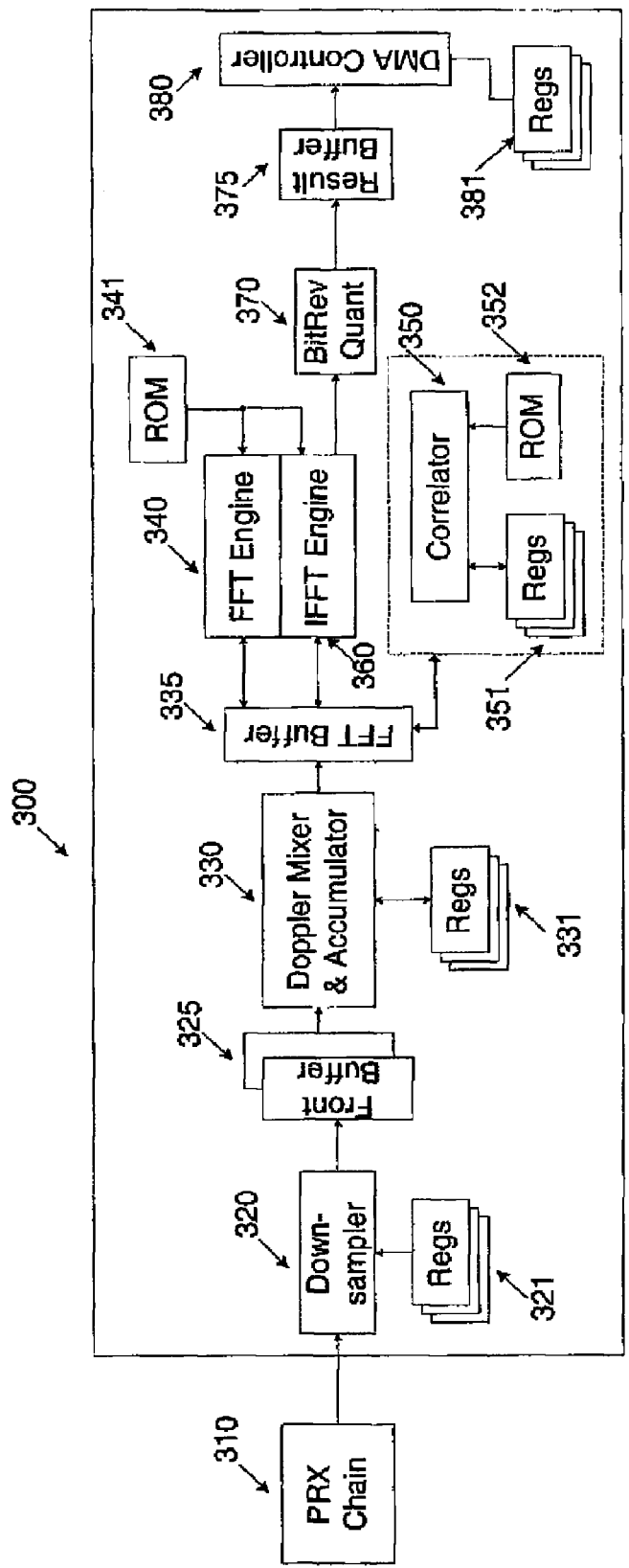
FIG. 3A is a block diagram of a positioning engine.
Figure 3B:
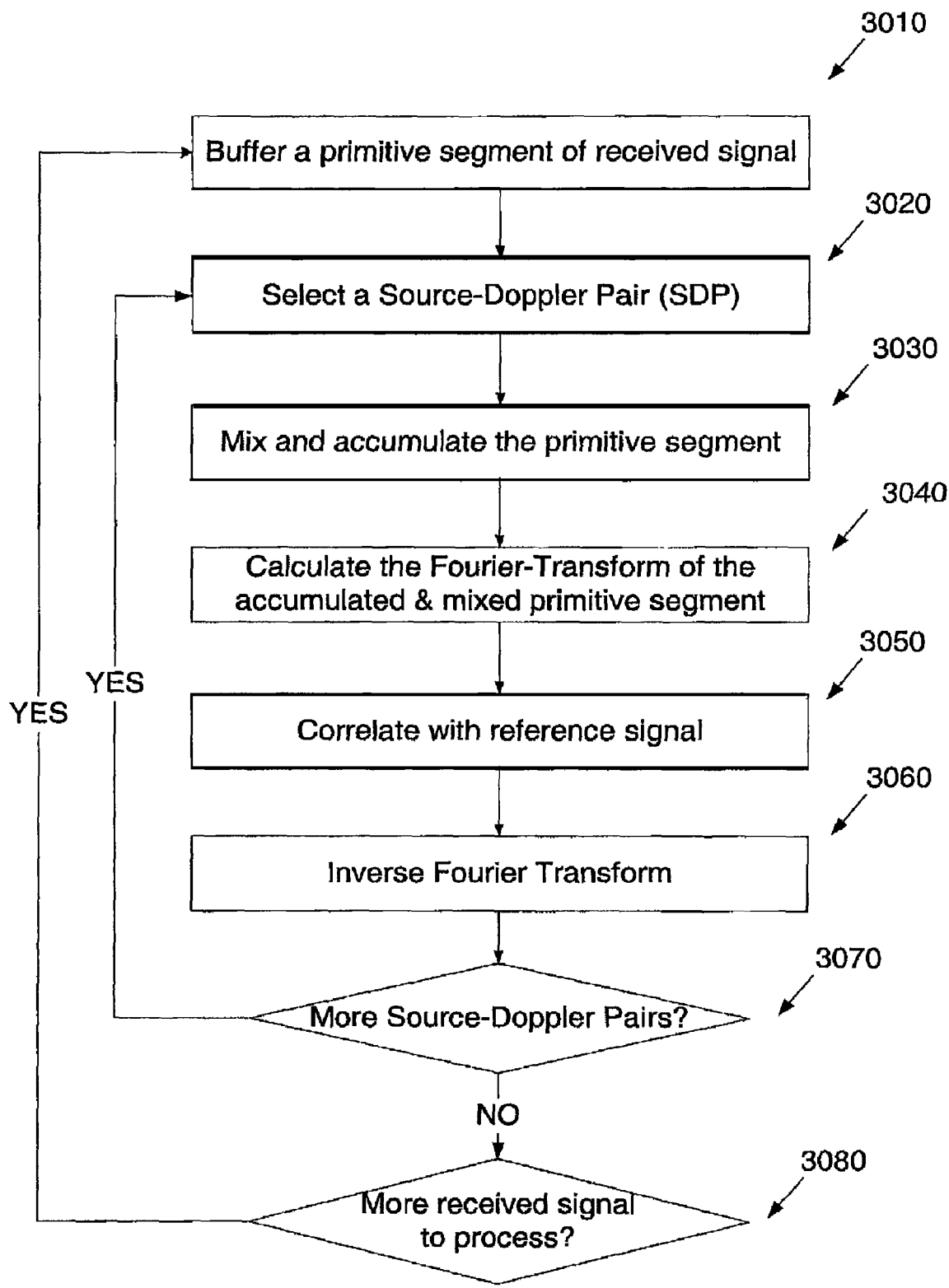
FIG. 3B is a flow diagram of a method performed in real time by a positioning engine.

During each computation period of duration L, the PE 140 processes a primitive segment of received signal by repeating a sequence of processing steps for each programmed SDP (source-Doppler pair), as illustrated in FIG. 3B. At 3010, a primitive segment of received signal is loaded into a buffer and processing begins from the first SDP. At 3020, one SDP is selected. The selected SDP provides a hypothesized signal source and a hypothesized Doppler shift. At 3030, the primitive segment is rotated to remove the hypothesized Doppler shift. If the primitive segment is longer than 1 ms, then the rotated signal is accumulated to form a 1 ms signal by wrapping the signal at the 1 ms boundaries and summing together the wrapped 1 ms signal segments. At 3040, the Fourier Transform of this accumulated segment is calculated. Typically, this is done by means of a Fast Fourier Transform (FFT) algorithm. At 3050, the segment is correlated with a locally generated copy of the reference signal associated with the selected satellite (or with the corresponding fraction of the reference signal if the length of the primitive segment is less than 1 ms). Some frequency components of this reference signal may be excluded from the correlation calculation, for example, for mitigating the effects of narrow-band noise. At 3060, the Inverse Fourier Transform of the frequency-domain correlation is calculated for the code-phases in the uncertainty region configured into the PE 140, resulting in a plurality of primitive correlation values for the given code-phases. At 3070 and 3080, once all SDPs have been processed, the procedure begins with a new primitive segment, until the configured duration of positioning signal has been processed.

Figure 6:
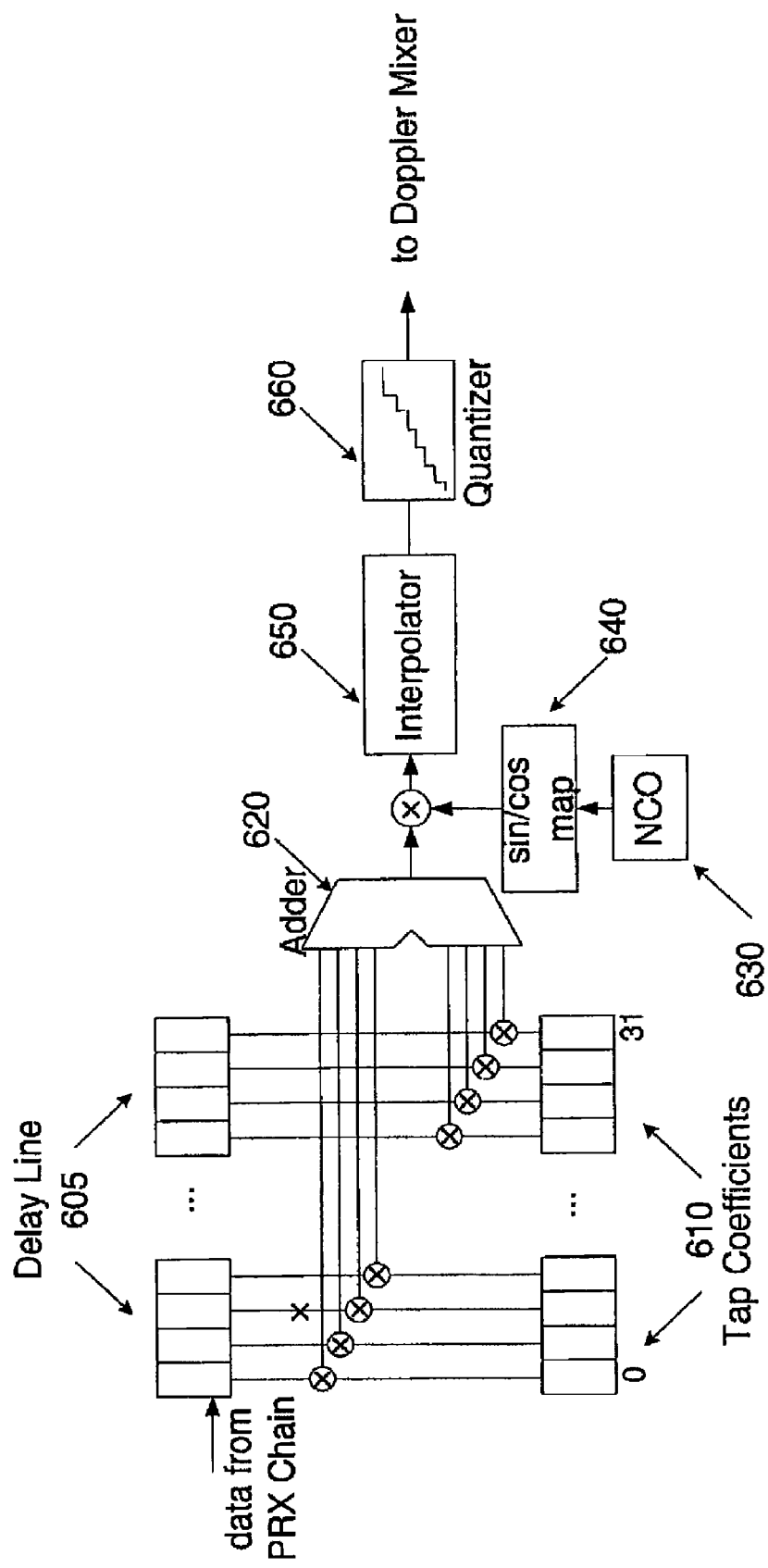
FIG. 6 is a block diagram of a downsampler.

FIG. 3A shows a block diagram of one embodiment of the PE 140 that carries out the steps shown in FIG. 3B. The data flow is from left to right in the figure. This block diagram can be modified with the addition of buffers in order to pipeline the calculations, as known to those skilled in the art. First, samples are received from the PRX Chain 310 (same as the PRX Chain 120 in FIG. 1) at a known sample rate, resolution (i.e. quantization level) and intermediate frequency (IF). Conversion to baseband frequency is carried out by the Downsampler 320, where the samples are filtered, digitally rotated to remove any remaining IF carrier common to all satellites, and downsampled to 2.048 M which is slightly more than twice the GPS C/A code chip rate of 1.023 MHz. One embodiment of the Downsampler 320 is shown in FIG. 6. The registers 321 are used for programming such things as the residual IF in the signal from the RF section, the Downsampler rate to get RF input samples to 2.048 MHz, the resolution of samples from the RF section, and parameters of the Downsampler 320. In one embodiment, a (2+2) complex format is used, resulting in baseband samples with width of four bits. In general, the width of the data samples varies based on tradeoffs between memory needed to store them (smaller is better) and the tolerance to quantization loss (wider samples result in less quantization loss). The baseband samples are configured in primitive segments of duration L and stored in the Front Buffer 325. This is a double buffer in which one is being filled while the data in the other is being processed repetitively, once per SDP. This processing is split into N timeslots or "channels", with the processing in each timeslot dedicated to a particular SDP. For instance, N=24 channels can be used to generate the primitive correlations for 24 unique SDPs to be searched.

The following operations are done for each SDP. First, the mixing and accumulating step 3030 is performed by block 330. The complex samples are read from the Front Buffer 325 and rotated to remove the hypothesized Doppler frequency shift, which is programmed into one of the registers 331 prior to the start of processing. The rotated complex results, which in some embodiments are in 8-bit (4+4) format, are written in pairs into the FFT Buffer 335 that is used as the working space for the following computations. If L is greater than 1 ms, then the samples are wrapped at the 1 ms boundaries and summed over the same accumulator, yielding an accumulated signal of duration 1 ms. Some embodiments contain multiple copies of block 330 that operate in parallel in order to increase throughput.

Next, the Fourier Transform 3040 is performed by the FFT Engine 340, using coefficients (commonly known as "twiddle factors") from ROM table 341, and with the results going back to the FFT Buffer 335. In some embodiments, a 16-bit (8+8) complex data path is used by the FFT Engine 340.

Correlation 3050 is carried out by the Correlator 350, which reads the data from the FFT Buffer 335, applies another SDP-specific rotation to account for the dilation of the code associated with the Doppler frequency shift, and computes the cross-correlation of the data with the SDP-specific PRN code stored in the Correlator's ROM 352. In some embodiments, some of the registers 351 store a list of frequencies to be excluded from the calculation of the correlation due, for example, to narrowband noise detected at those frequencies. The Correlator 350 writes the data back to the FFT Buffer 335, where the Inverse FFT Engine 360 performs the Inverse Fourier Transform step 3060 to generate cross-correlations for a range of code-phases. These results are written to the Result Buffer 375 with bit-reversed addressing and quantization 370 applied to achieve the desired ordering and data width. Typically, the Inverse FFT Engine 360 utilizes the same computational logic and ROM as the FFT Engine 340. After this sequence is completed, another SDP is processed, or, if all SDPs have been processed, the cycle begins from the first SDP with a new set of baseband samples, until the programmed duration of the received signal has been processed.

The results in the Result Buffer 375 are written to the main device data memory via a Direct Memory Access (DMA) Controller 380, which arbitrates with other devices (including the CPU) for control of the data memory bus. DMA techniques are well known to those skilled in the art, so they will be described further here. In some embodiments of the present invention each of the N channels in the PE will be allocated a separate block of memory in which to store its results. This is accomplished by having N different address registers for the DMA Controller 380, each containing the pointer to memory space for a specific SDP. These and other registers to configure the DMA Controller 380 are shown at 381.

Figure 4:
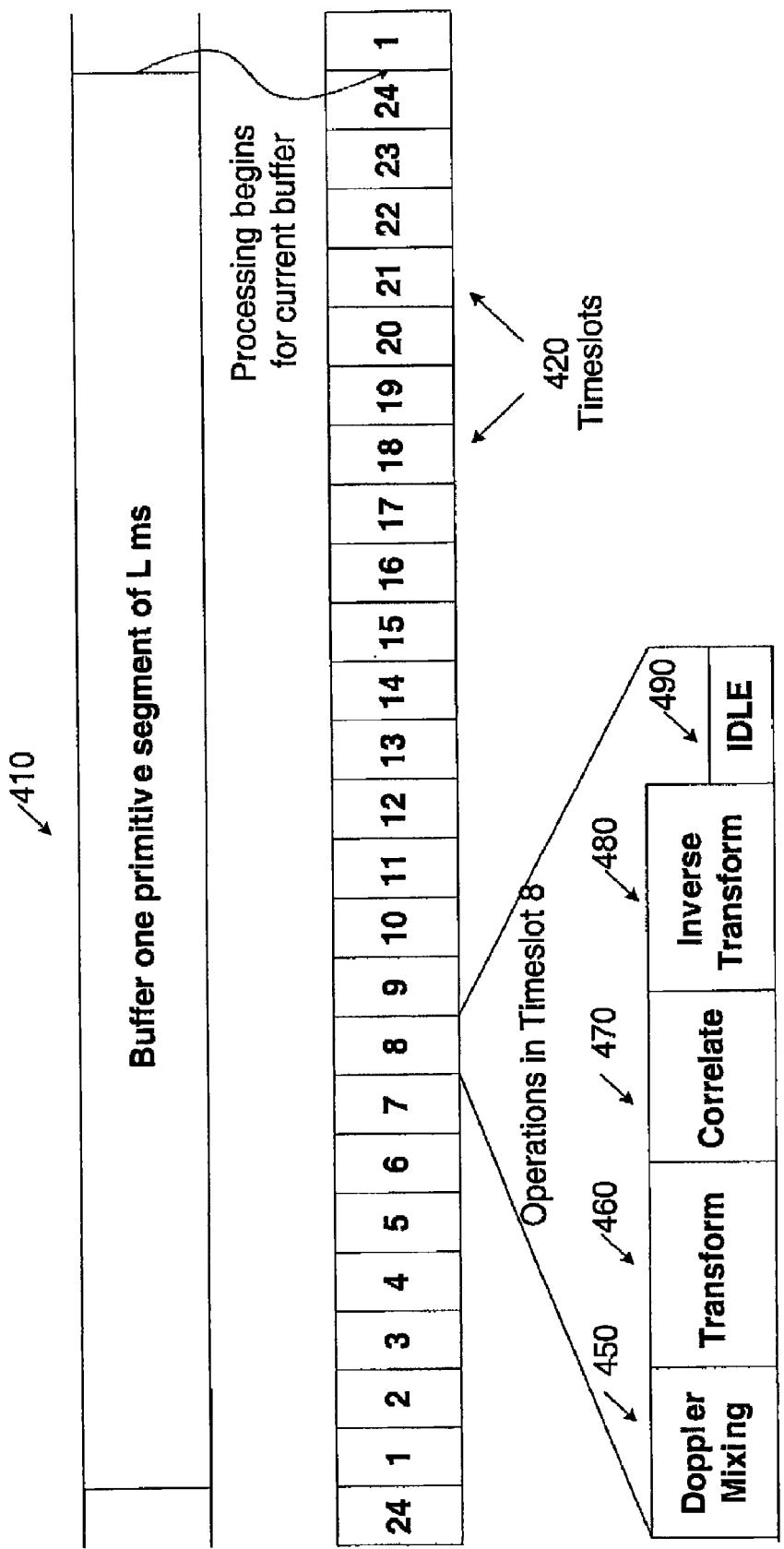
FIG. 4 illustrates the timing of the real time calculations performed by a positioning engine and the subdivision into timeslots.

A diagram showing approximate operational timing of the Positioning Engine is shown in FIG. 4. During a period 410 of duration L, a primitive segment of received signal is buffered. The period 410 is decomposed into N timeslots 420. In the example shown, there are 24 timeslots, corresponding to 12 satellites times 2 Doppler bins. At the end of each timeslot all processing for one SDP relative to the buffered primitive segment is completed.

In a preferred embodiment, processing is done in a serial flow in order to maximize use of logic and memory and thereby reduce size and cost. However, as explained earlier, it is possible to pipeline the calculations by adding extra buffers between the computational blocks of FIG. 3A.

In some preferred embodiments, as described earlier, the processing for one SDP comprises four major steps: Mixing 450, Fourier Transform 460, Correlation 470, and Inverse Fourier Transform 480. The number of cycles required to complete each of these steps depend of factors such as the length L of the primitive segments, whether the Positioning Engine contains multiple copies of certain blocks in FIG. 3A (e.g. the Mixer 330) that operate in parallel, etc.

Once the Positioning Engine completes its task, a set of two-dimensional grids of primitive correlation values, one grid for each SDP, are stored in memory. Each row in the grid represents the primitive correlation values for a particular code-phase for all primitive segments, and each column in the grid represents the primitive correlation values of a particular primitive segment for all hypothesized code-phases. This is described also in application 557.

If the code-phases and the Dopplers are approximately known, for example, from aiding data, then the code-phase range that needs to be hypothesized to acquire the signal is less than the whole code-phase range and the memory required to store the grids may be significantly less than the memory required to store the positioning signal. Hence, in this scenario, the Positioning Engine compresses the received positioning signal into a representation that reduces the amount of memory required.

The PRX Background Algorithm Run by the Shared CPU

Figure 5:
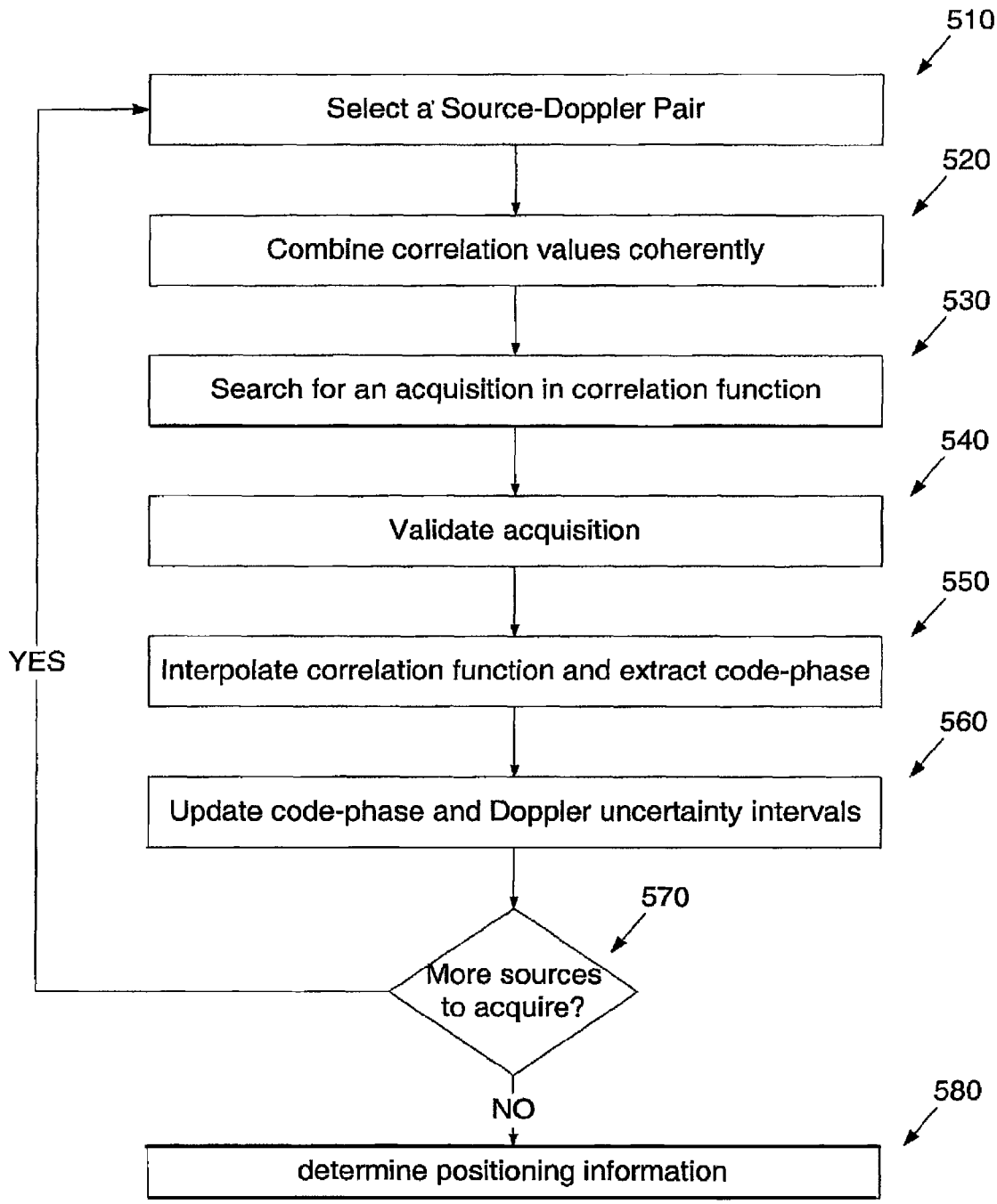
FIG. 5 is a flow diagram of a background method for processing the real time calculations of a positioning engine and determining positioning information.

FIG. 5 illustrates one embodiment of the PRX Processing Function (PRXP) running as a background process by the CPU 151 (the shared processor) after the positioning engine has completed its calculations.

At 510, an SDP is selected as a target for acquisition. Typically, signal sources that are more likely to be acquired and signal sources that, if acquired, are likely to provide more information are selected first. For example, in embodiments utilizing GPS signals, satellites located above the receiver may be selected before those at the horizon because they may provide a tighter bound on time if altitude is known.

At 520, the sequence of correlation values in each row of the selected SDP's grid is combined coherently into a plurality of "refined" correlation values associated to a plurality of refined Doppler frequencies. This is explained in more detail in application 557. One method to perform this coherent combination is to calculate the FFT of each row. In some embodiments, the PE 140 is utilized to perform this TFT. To do this, the CPU 151 loads one or more rows of the grid into the FFT Buffer 335 and the FFT Engine 340 operates in place in the FFT Buffer 335. Then the result is read out by the CPU 151. Alternatively, the FFT Engine 340 may split the data in the FFT Buffer into segments to operate on them in parallel.

The result of step 520 is a coherent correlation function in two variables, a code-phase variable and a Doppler frequency variable. At 530, the coherent correlation function is searched for a peak above an acquisition threshold. This search is performed only over code-phases and refined Doppler frequencies within a code-phase uncertainty interval and a Doppler uncertainty interval. These uncertainty intervals are updated after each validated acquisition. A method to perform this update is described in application 229. Furthermore, the code-phase and Doppler uncertainty intervals can be significantly tightened by utilizing the available aiding data.

At 540, if an acquisition has occurred, one or more validation tests are carried out on the coherent correlation function. For example, the presence of other peaks in the correlation function can be tested. The presence of many other large peaks may indicate that the acquisition was false due to the cross-correlation induced by another strong source's signal correlating with the selected source's reference code. Another validation test is performed to detect multi-path phenomena. If multi-path is detected, the code-phase search may be adjusted to be around an earlier peak or the uncertainty code-phase interval may be made larger. In extreme cases, the acquisition may be marked as bad and discounted in the subsequent position determination.

At 550, if a validated acquisition has been obtained, the coherent correlation function at the acquired Doppler value is interpolated to extract a refined code-phase value.

At 560, the uncertainty regions for code-phases and Doppler frequencies are updated based on the information obtained from all the validated acquisition. Acquisition thresholds are also updated accordingly. If there are more sources to be acquired (570) then a new SDP is selected at 510. A source that was previously selected without yielding an acquisition may be selected again if its acquisition threshold has changed. Once all hypothesized sources have been searched at least once and it has been determined that no more acquisitions are possible, control is transferred to 580 and positioning information is calculated. In some embodiments, this positioning information comprises a location estimate. Some preferred methods to calculate a location estimate are described in application 556.

In other embodiments, a portion of the calculations to determine the location may be carried out at a server to which the mobile device is connected. For example, the positioning information calculated by the multi-function device may comprise pseudo-ranges or other quantities that are transmitted to a basestation via the MS function of the device. Then the basestation transmits the positioning information to a server that utilizes it to estimate the location.

The Downsampler

FIG. 6 shows a block diagram of one possible embodiment of the Downsampler 320. The digitized positioning signal from PRX Chain 120 is fed into the Delay Line 605. This input signal is typically at an intermediate frequency, for example, 19.2 Mhz in some GPS embodiments. The Tap Coefficients 610 (stored in registers 321) and the Adder 620 implement a band pass filter cascaded with a Hilbert transform that removes one of the two conjugate-symmetric images from the frequency domain representation of the input positioning signal. This transformed signal is then multiplied by a sinusoidal signal generated by block 640, fed by the Numerically Controlled Oscillator (NCO) 630, for conversion to baseband. Then, Interpolator 650 resamples the baseband signal at the desired time points, typically at a much lower frequency (e.g. 2.048 Mhz). The Interpolator 650 and the associated programmable coefficients (stored in registers 321) enable non-integer downsampling so that various kinds of PRX Chains (the GPS RF section of the device) can be supported. Finally, the Quantizer 660 quantizes the signal to the desired resolution.

Mitigation of Narrowband Noise

Figure 7:
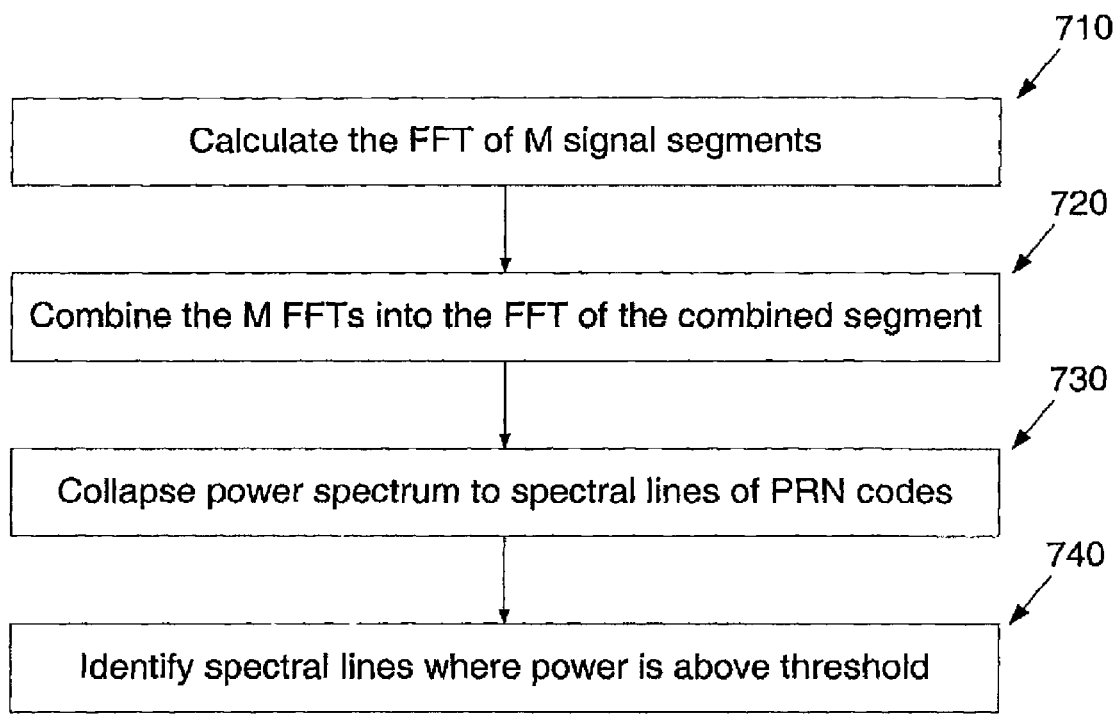
FIG. 7 is a flow diagram of a method for detecting narrow-band noise.

FIG. 7 describes one embodiment of a method used to mitigate the effects of narrowband noise. This method may be used at block 230 by the method described in FIG. 2. At block 710, the process calculates the FFT of M signal segments from which the IF carrier frequency and estimate Doppler frequency have been removed. In some embodiments, these segments are consecutive segments of length 1 ms. The result of combining or concatenating these segments is henceforth referred to as "extended segment". In some embodiments, these M FFTs are calculated by the PE 140 in real time and written to a memory.

At block 720, the M FFTs are combined to yield the Fourier transform of the extended segment. In typical embodiments, the extended segment has a length of M ms. This calculation is typically performed by the CPU 151. One typical value of M is 16, but other values may be appropriate depending on the available computational resources, the stationarity of the narrowband noise, and the desired accuracy of the narrowband noise estimate.

In some embodiments, the step at 710 is eliminated and the FFT of the extended segment is calculated directly.

The power spectrum of the extended segment, obtained by squaring the magnitudes of its Fourier transform coefficients, contains M spectral lines in each 1 Khz interval (assuming that the length of the extended segment is M ms). In contrast, the PRN codes contain one spectral line in each 1 KHz interval. At block 730, the power spectrum of the extended segment is collapsed onto the 1 Khz spectral lines of the PRN codes. For example, this can be done by using of the formula:

$$\Psi(f') = \sum_f G(f) \mathrm{sinc}^2 \frac{\pi(f'-f)}{\mathrm{KHz}}, \qquad (1)$$

where G(f) is the power spectrum of the extended segment and Ψ(f') is the corresponding estimated power at the 1 KHz spectral lines. Note that the frequencies f' are integer multiples of 1 KHz and the frequencies f are integer multiples of 1/M KHz. Those skilled in arts will recognize that other similar interpolation techniques can be used to calculate power estimates at the 1 KHz spectral lines from the set of 1/M KHz spectral lines.

At 740, the spectral lines f' of the PRN code for which Ψ(f') is greater than a threshold are identified. The list of these frequencies can be stored in registers 351 so that the Correlator 350 can exclude them from the calculation of the correlation. The value of the threshold is defined by determining a tradeoff point between the lost signal strength and the strength of the retained narrowband noise, as those skilled in the art know.

The above detailed description is provided to illustrate specific embodiments of the present invention and is not intended to be limiting. Numerous variations and modifications within the scope of the present invention are possible. The present invention is set forth in the following claims.

The invention claimed is:

1. A multi-function mobile device capable of radio communication with a data network/multimedia reproduction and determination of a position based on a positioning signal, comprising:
 a positioning engine in said mobile device that performs real-time calculations with said positioning signal;
 a shared memory coupled to said positioning engine that (1) receives and stores in real time results of said real-time calculations, each said result comprising correlations under a hypothesis relating the position signal with a selected signal source and a selected Doppler shift and (2) acts as a storage memory for said radio communication or multimedia reproduction functions; and
 a shared processor coupled to said memory that (1) retrieves and processes said results to generate positioning information, (2) performs communication protocol functions for said radio communication or multimedia reproduction, and (3) dynamically allocates the shared memory in real time as the results are retrieved and processed,
 wherein said positioning engine and said shared processor access said memory independently.

2. The device of claim 1, wherein said memory is shared with a co-processor of the mobile device.

3. The device of claim 1, wherein said results are associated with a plurality of source-Doppler pairs and said shared processor allocates a memory block for each source-Doppler pair to store said positioning engine results and said allocated memory block can be later released by the shared processor for its use.

4. The device of claim 2, wherein said positioning engine results are associated with a plurality of source-Doppler pairs and said shared processor allocates a memory block for each source-Doppler pair to store said positioning engine results and said allocated memory block can be later released by the shared processor for its use or use by the co-processor.

5. The device of claim 1, wherein such shared memory is accessed by said positioning engine and said shared processor through a shared memory interface and memory requests by the positioning engine and by the processor have to be arbitrated to allow the positioning engine to access the shared memory to keep up with memory bandwidth requirement of real time calculation of said position signal.

6. A device to process a received positioning signal in real time and to conduct radio communication with a data network or to process multimedia data comprising:
 a shared memory between processors;
 a first processor coupled to said memory including:
  means for downsampling said positioning signal from an intermediate frequency, to yield a baseband signal;
  means for mixing and accumulating said baseband signal, to yield an accumulated signal;
  means for correlating and accumulating said accumulated signal with a plurality of hypotheses of a reference signal, to yield a plurality of correlation values; and
  means for writing said plurality of correlation values to said memory, each correlation written being a correlation calculated under a hypothesis relating the position signal with a signal source and a Doppler shift; and
 a second processor coupled to said memory configured to (1) retrieve said plurality of correlation values for further processing to generate positioning information, (2) conduct said radio communication or multimedia processing, and (3) dynamically allocate said memory in real time,
 wherein said first processor and said second processor access said memory independently.

7. A multi-function mobile device capable of radio communication with a data network or multimedia reproduction and determination of a position based on a positioning signal, comprising:
 a positioning engine in said mobile device that performs real-time correlation of said positioning signal with a plurality of code phases of a plurality of source-Doppler pairs to generate a plurality of primitive correlation results wherein each of the plurality of said source-Doppler pairs comprises a reference code from a hypothesized signal source and a hypothesized Doppler frequency;
 a shared memory coupled to said positioning engine that (1) receives and stores in real time said plurality of primitive correlation results in a plurality of dynamically allocated memory blocks and (2) acts as a storage memory for said radio communication or multimedia reproduction functions;
 a shared processor coupled to said memory that (1) retrieves and processes said plurality of primitive correlation results to generate positioning information, (2) performs communication protocol functions for said radio communication or multimedia reproduction, and (3) dynamically allocates said plurality of memory blocks in real time as the plurality of primitive correlation results are retrieved and processed,
 wherein said positioning engine and said shared processor access said memory independently.

8. The device of claim 7, wherein said memory is shared with a co-processor of the mobile device.

9. The device of claim 7, wherein said shared processor allocates a memory block for each of the plurality of said source-Doppler pairs to store said primitive correlation results and said allocated memory block can be later released by the shared processor for its use.

10. The device of claim 7, wherein said plurality of dynamically allocated memory blocks is fragmented and a memory pointer is allocated for the position engine to access each of said plurality of memory blocks.

11. The device of claim 7, wherein such shared memory is accessed by said positioning engine and said shared processor through a shared memory interface and memory requests by the positioning engine and by the processor have to be arbitrated to allow the positioning engine to access the shared memory to keep up with memory bandwidth requirement of real time calculation of said plurality of primitive correlation results.

12. A device to process a received positioning signal in real time and to conduct radio communication with a data network or to process multimedia data comprising:

a shared memory between processors;
a first processor coupled to said memory comprising:
- means for downsampling said positioning signal from an intermediate frequency, to yield a baseband signal;
- means for mixing and accumulating said baseband signal, to yield an accumulated signal;
- means for correlating and accumulating said accumulated signal with a plurality of code phases of a reference signal associated with a plurality of source-Doppler pairs, to yield a plurality of correlation values, wherein each of the plurality of source-Doppler pairs comprises a hypothesized signal source and a hypothesized Doppler frequency; and
- means for writing said plurality of correlation values to a plurality of dynamically allocated memory blocks of said shared memory; and a second processor coupled to said memory configured to (1) retrieve and process said plurality of correlation values to generate positioning information, (2) conduct said radio communication or multimedia processing, and (3) dynamically allocate said plurality of memory blocks in real time as said plurality of correlation values are retrieved and processed, wherein said first processor and said second processor access said memory independently.

13. The device of claim 1, wherein said positioning engine and said shared processor reside within an integrated circuit.

14. The device of claim 1, wherein said positioning engine and said shared processor reside on separate integrated circuits.

15. The device of claim 1, wherein said shared processor executes an operating system to dynamically allocate said shared memory for storing results of said real-time calculations from said positioning engine and for performing said radio communication or multimedia reproduction functions.

16. The device of claim 1, wherein said shared memory comprises a plurality of memories with different speed and size.

17. The device of claim 7, wherein said positioning engine and said shared processor reside within an integrated circuit.

18. The device of claim 7, wherein said positioning engine and said shared processor reside on separate integrated circuits.

19. The device of claim 7, wherein said shared processor executes an operating system to dynamically allocate said shared memory for storing said plurality of primitive correlation results and for performing said radio communication or multimedia reproduction functions.

20. The device of claim 7, wherein said shared memory comprises a plurality of memories with different speed and size.

* * * * *